(12) United States Patent
Nishiyama

(10) Patent No.: US 10,690,001 B2
(45) Date of Patent: Jun. 23, 2020

(54) STOP VALVE AND STEAM TURBINE

(71) Applicant: MITSUBISHI HEAVY INDUSTRIES COMPRESSOR CORPORATION, Tokyo (JP)

(72) Inventor: Kenichi Nishiyama, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 119 days.

(21) Appl. No.: 16/142,193

(22) Filed: Sep. 26, 2018

(65) Prior Publication Data

US 2019/0093501 A1   Mar. 28, 2019

(30) Foreign Application Priority Data

Sep. 28, 2017   (JP) ................................. 2017-188060

(51) Int. Cl.
| | | |
|---|---|---|
| *F01D 17/10* | (2006.01) | |
| *F01D 25/12* | (2006.01) | |
| *F01D 21/16* | (2006.01) | |
| *F01D 17/18* | (2006.01) | |
| *F16K 31/56* | (2006.01) | |
| *F16K 31/04* | (2006.01) | |

(52) U.S. Cl.
CPC ............ *F01D 17/10* (2013.01); *F01D 17/18* (2013.01); *F01D 21/16* (2013.01); *F01D 25/12* (2013.01); *F16K 31/047* (2013.01); *F16K 31/56* (2013.01)

(58) Field of Classification Search
CPC .......... F01D 17/18; F01D 17/10; F01D 21/16; F01D 25/12; F16K 31/047; F16K 31/56

USPC ............................................ 137/627.2, 637.2
See application file for complete search history.

(56) References Cited

U.S. PATENT DOCUMENTS

| 2,657,005 | A | * | 10/1953 | Van Nest | .............. F16K 39/024 |
|---|---|---|---|---|---|
| | | | | | 251/269 |
| 2,663,318 | A | * | 12/1953 | Lakso | .................. F16K 31/143 |
| | | | | | 251/14 |
| 2,775,665 | A | * | 12/1956 | Harstick | ................ H01H 35/10 |
| | | | | | 200/80 R |
| 2,865,475 | A | * | 12/1958 | MacMillin | ............. G03B 19/18 |
| | | | | | 188/187 |

(Continued)

FOREIGN PATENT DOCUMENTS

WO   2017/104035 A1   6/2017

*Primary Examiner* — Angelisa L. Hicks
(74) *Attorney, Agent, or Firm* — Osha Liang LLP

(57) ABSTRACT

A stop valve includes a connection-switching part capable of switching a connection state between a rod part having an end portion which is connected to a valve disc and an actuator part which linearly moves the rod part. The connection-switching part includes a concave engaging part which is recessed the rod part, a casing having an accommodation space joined to the concave engaging part formed therein, a plurality of frame pieces, a sleeve part which is movable between the frame piece accommodation position and a frame piece detachment position, and a gas introduction part through which a gas is introduced into the accommodation space. The sleeve part moves from the frame piece detachment position to the frame piece accommodation position using the gas. The casing is in contact with the frame pieces at the frame piece accommodation position when moving toward the second side in the central axis direction.

11 Claims, 6 Drawing Sheets

(56) References Cited

U.S. PATENT DOCUMENTS

| | | | | |
|---|---|---|---|---|
| 4,007,906 | A * | 2/1977 | Karpenko | F16B 37/043 |
| | | | | 251/26 |
| 4,309,022 | A * | 1/1982 | Reinicke | F16K 31/1221 |
| | | | | 251/297 |
| 4,530,377 | A * | 7/1985 | Peters | E21B 34/16 |
| | | | | 137/596.15 |
| 5,848,779 | A * | 12/1998 | Murbe | F01D 21/18 |
| | | | | 251/29 |
| 6,129,333 | A * | 10/2000 | Ma | F16K 31/56 |
| | | | | 251/68 |
| 6,352,239 | B1 * | 3/2002 | McIntosh | E21B 34/04 |
| | | | | 251/100 |
| 6,377,146 | B1 * | 4/2002 | Batteux | H01H 71/505 |
| | | | | 335/253 |
| 7,509,972 | B2 * | 3/2009 | Nesbitt | F16K 35/06 |
| | | | | 137/383 |
| 8,678,342 | B2 * | 3/2014 | Sakai | F16K 31/1225 |
| | | | | 251/63.5 |
| 9,790,805 | B2 * | 10/2017 | Takemaru | F01D 17/145 |
| 2009/0277726 | A1 * | 11/2009 | Wasser | F16D 67/00 |
| | | | | 188/71.2 |
| 2011/0277478 | A1 * | 11/2011 | Jacoby, Jr. | F01D 17/06 |
| | | | | 60/660 |
| 2014/0261782 | A1 * | 9/2014 | Vu | F16K 17/196 |
| | | | | 137/469 |
| 2014/0361208 | A1 * | 12/2014 | Tsuji | F01D 17/145 |
| | | | | 251/368 |
| 2016/0123179 | A1 * | 5/2016 | Takemura | F16K 31/44 |
| | | | | 251/58 |
| 2016/0208636 | A1 * | 7/2016 | Ooishi | F01D 17/10 |
| 2017/0146147 | A1 * | 5/2017 | Been | F16K 31/047 |
| 2017/0248210 | A1 * | 8/2017 | Muller | F16H 25/24 |

\* cited by examiner

STOP VALVE AND STEAM TURBINE

CROSS-REFERENCE TO RELATED APPLICATION

Priority is claimed on Japanese Patent Application No. 2017-188060, filed Sep. 28, 2017, the content of which is incorporated herein by reference.

BACKGROUND

Field

The present disclosure relates to a stop valve and a steam turbine.

Description of Related Art

A steam turbine rotatably drives rotors using steam supplied from a boiler. Steam turbines operate a generator when transmitting the rotation of the rotors.

Stop valves are provided in steam supply pipes which transmit steam from a boiler to a turbine main body. Stop valves are brought into an open state when a steam turbine is operating normally. Thus, steam is supplied from a boiler to a turbine main body through steam supply pipes. Stop valves are brought into a closed state when an abnormality occurs in a steam turbine and the supply of steam from the boiler to the turbine main body is cut off.

Patent Document 1 describes a main stop valve including a valve seat provided in the middle of a flow path of steam, a valve disc which is able to be in contact with the valve seat, a rod having one end connected to a valve disc, a piston which drives the rod, and a connection state-changing part which switches the rod and the piston between a connected state and a non-connected state. The connection state-changing part includes a sleeve which holds an end portion of the rod, a holder which slidably holds the sleeve, a semi-circular cross-sectional-shaped latch which rotates between the sleeve and the holder, and an air cylinder which drives a lever configured to change a position of the latch. The latch rotates while sliding in a concave part formed in an inner circumferential surface of the holder via the lever when the air cylinder drives the lever. Thus, the latch protrudes from the inner circumferential surface of the holder and engages with a notch formed on an outer circumferential surface of the sleeve. As a result, the sleeve is held in the holder and the rod is connected to the piston. In this way, the connection state-changing part described in Patent Document 1 switches the connection state between the rod and the piston by rotating the latch.

Such a stop valve is brought into a closed state only in limited situations as in an emergency stop. For this reason, the opportunity to move the valve disc is limited. In other words, switching of the connection state between the rod part to which the valve disc is connected and the actuator part which drives the rod part is performed only in limited situations.

Patent Document

[Patent Document 1] PCT International Publication No. WO2017/104035

SUMMARY

However, even though a stop valve is used infrequently, it needs to operate at the time of an emergency stop. For this reason, a highly reliable stop valve capable of switching a connection state between a rod part and an actuator part with high accuracy is desirable.

The present disclosure provides a stop valve and a steam turbine, which are capable of switching a connection state between a rod part and an actuator part with high accuracy.

A stop valve according to a first aspect of the present disclosure includes: a valve seat part which is provided in a flow path through which steam flows; a valve disc which closes the flow path by coming into contact with the valve seat part; a rod part which extends along a central axis and in which an end portion on a first side in a central axis direction is connected to the valve disc; a rod-urging part which urges the rod part toward the first side in the central axis direction to close the valve seat part by the valve disc; an actuator part which linearly moves the rod part toward a second side in the central axis direction against an urging force of the rod-urging part when being connected to the rod part; and a connection-switching part which is able to switch a connection state between the rod part and the actuator part between a connected state and a non-connected state, wherein the connection-switching part includes: a concave engaging part which is formed over the entire circumference of an outer circumferential surface of the rod part and recessed from the outer circumferential surface of the rod part in a radial direction centered on the central axis; a casing which has an accommodation space joined to the concave engaging part formed therein by covering the rod part from the outside in the radial direction to surround the concave engaging part and provided to be connected to the actuator part and to be able to be in sliding contact with the outer circumferential surface of the rod part; a plurality of frame pieces which are disposed in the accommodation space and in which a part thereof protrudes from the outer circumferential surface of the rod part while being accommodated in the concave engaging part; a sleeve part which is disposed in the accommodation space to be able to be in sliding contact with the casing, and is able to move between a frame piece accommodation position in which the frame pieces are accommodated in the concave engaging part and a frame piece detachment position in which the frame pieces are separated from the concave engaging part; and a gas introduction part through which a gas is introduced into the accommodation space, the sleeve part moves from the frame piece detachment position to the frame piece accommodation position when the gas is introduced into the accommodation space, and the casing comes into contact with the frame pieces disposed at the frame piece accommodation position when being moved toward the second side in the central axis direction.

With such a constitution, it is possible to switch a connection between the rod part and the actuator part when positions of the frame pieces with respect to the concave engaging part are adjusted by controlling the movement of the sleeve part by a gas. It is thus possible to prevent the occurrence of an inconvenience such as the frame pieces being unable to be moved due to the entry of contaminants when the sleeve part is not always in contact with the frame pieces.

In a stop valve according to a second aspect of the present disclosure, in the first aspect, the connection-switching part may further include a sleeve-urging part which is accommodated in the accommodation space and urges the sleeve part toward the second side in the central axis direction, and the casing may include: a first housing which is able to be in sliding contact with the sleeve part inward in the radial direction and is able to be in sliding contact with the outer circumferential surface of the rod part at a position closer to the second side in the central axis direction with respect to the concave engaging part; and a second housing which is able to be in sliding contact with the sleeve part outward in the radial direction and fixed to the first housing, the gas is introduced to the position closer to the second side in the central axis direction with respect to the sleeve part through the gas introduction part, and the sleeve part moves from the frame piece detachment position to the frame piece accommodation position when moving from the second side toward the first side in the central axis direction.

With such a constitution, the sleeve is sandwiched between the first housing and the second housing in a sliding contact state. For this reason, the first housing and the second housing function as a guide when the sleeve part is moved in the central axis direction. When high-pressure air is introduced in a state in which the sleeve part is guided by the first housing and the second housing, it is possible to smoothly move the sleeve part toward the first side in the central axis direction using the pressure of the high-pressure air. In other words, it is possible to efficiently use the pressure of the high-pressure air supplied to the accommodation space on the second side in the central axis direction of the sleeve part.

Also, in a stop valve according to a third aspect of the present disclosure, in the second aspect, an end surface of the first housing on the first side in the central axis direction may be formed closer to the second side in the central axis direction with respect to the concave engaging part and inclined from the first side toward the second side in the central axis direction outward in the radial direction.

With such a constitution, the end surface on the first side in the central axis direction of the first housing which is a side on which the rod part is inserted is inclined. For this reason, it is possible to insert the frame pieces toward the inside of the accommodation space when the rod part is inserted. Thus, it is possible to prevent the frame pieces from becoming an obstacle when the rod part is inserted.

In a stop valve according to a fourth aspect of the present disclosure, in the second or third aspect, the sleeve part may include a first extension part which is able to be in sliding contact with the first housing; a second extension part which is disposed to be separated from the first extension part to the outside in the radial direction and is able to be in sliding contact with the second housing; and a sleeve connection part which connects the first extension part and the second extension part and which has a sleeve-urging part accommodation groove in which in which the sleeve-urging part is accommodated between the first extension part and the second extension part formed therein.

With such a constitution, when the sleeve part is moved by the sleeve-urging part toward the second side in the central axis direction, the sleeve part moving while being supported by the first extension part and the second extension part. Thus, it is possible to prevent the sleeve part from being inclined in the central axis direction and causing it to be hooked to the first housing or the second housing. As a result, it is possible to move the sleeve part more smoothly from the frame piece detachment position to the frame piece accommodation position.

In a stop valve according to a fifth aspect of the present disclosure, in any one of the first to fourth aspects, the connection-switching part may include a retainer part including a plurality of partition parts which extend in the central axis direction and are disposed between the plurality of frame pieces at predetermined intervals in a circumferential direction centered on the central axis and an annular connection part which connects the plurality of partition parts.

With such a constitution, it is possible to prevent the frame pieces from being biased toward a part in the circumferential direction when the retainer part is included. Therefore, it is possible to stably accommodate the frame pieces over the entire circumference of the concave engaging part. Thus, it is possible to hold the rod part over the entire circumference and stably maintain the connected state.

In a stop valve according to a sixth aspect of the present disclosure, in any one of the first to fifth aspects, the connection-switching part may further include a sliding contact part which is disposed in a region in which the casing and the sleeve part are in sliding contact with each other and has a surface with a surface friction coefficient smaller than that of the casing.

With such a constitution, it is possible to improve the sliding property. Therefore, it is possible to improve the sliding property of the sleeve part with respect to the casing without supplying another lubricant such as lubricating oil.

In a stop valve according to a seventh aspect of the present disclosure, in any one of the first to sixth aspects, the connection-switching part may further include a piston ring which is disposed in a region in which the casing and the sleeve part are in sliding contact with each other.

With such a constitution, it is possible to prevent a gas supplied to the accommodation space from flowing directly in the central axis direction of the sleeve part. As a result, it is possible to move the sleeve part effectively using the pressure of the gas.

In a stop valve according to an eighth aspect of the present disclosure, in any one of the first to seventh aspects, the rod part may include: a main cooling hole which opens in an end portion of the rod on the second side in the central axis direction and extends toward the first side in the central axis direction is formed therein and an outlet cooling hole which extends in the radial direction closer to the first side in the central axis direction with respect to the concave engaging part and opens in the outer circumferential surface of the rod to allow the outside to communicate with the main cooling hole which is formed therein; and the connection-switching part includes a coolant supply part which supplies a coolant to an opening of the main cooling hole.

With such a constitution, when the coolant supplied from the coolant supply part flows to the main cooling hole, the outer circumferential surface of the rod part is cooled. As a result, the frame pieces disposed around the rod part are cooled. Thus, it is possible to prevent a temperature of the outer circumferential surface of the rod part from being too high even when a temperature of the outer circumferential surface of the rod part increases due to the frictional heat generated by the sliding contact with the casing or the heat transmitted from high-temperature steam flowing through the valve chamber.

In a stop valve according to a ninth aspect of the present disclosure, in any one of the first to eighth aspects, the connection-switching part may further include an elastic deformation part which is disposed between the actuator part and the casing and is elastically deformable in the central axis direction.

With such a constitution, it is possible to absorb a load generated in the casing using the elastic deformation part. Therefore, it is possible to secure the reliability of the behavior of the stop valve without using a motor with a high performance such as a servo motor for the actuator part.

In a stop valve according to a tenth aspect of the present disclosure, in any one of the first to ninth aspects, the frame pieces may be spherical ball members.

With such a constitution, it is possible to further prevent the occurrence of inconvenience around the sliding portion because the areas of the frame pieces in sliding contact with other components are reduced when the frame pieces are spherical.

A steam turbine according to an eleventh aspect of the present disclosure includes: the stop valve according to any one of the first to tenth aspects; and a turbine main body which is driven by steam supplied through a flow path which is opened and closed by the stop valve.

With such a constitution, it is possible to stably supply steam to the turbine main body by the stop valve in which the reliability of the switching of the connection state is secured. Therefore, it is possible to improve the reliability of the steam turbine.

According to the present disclosure, it is possible to perform the switching of a connection state between a rod part and an actuator part with high accuracy.

DETAILED DESCRIPTION

First Embodiment

A first embodiment of the present disclosure will be described below with reference to FIGS. 1 to 5.

Figure 1:
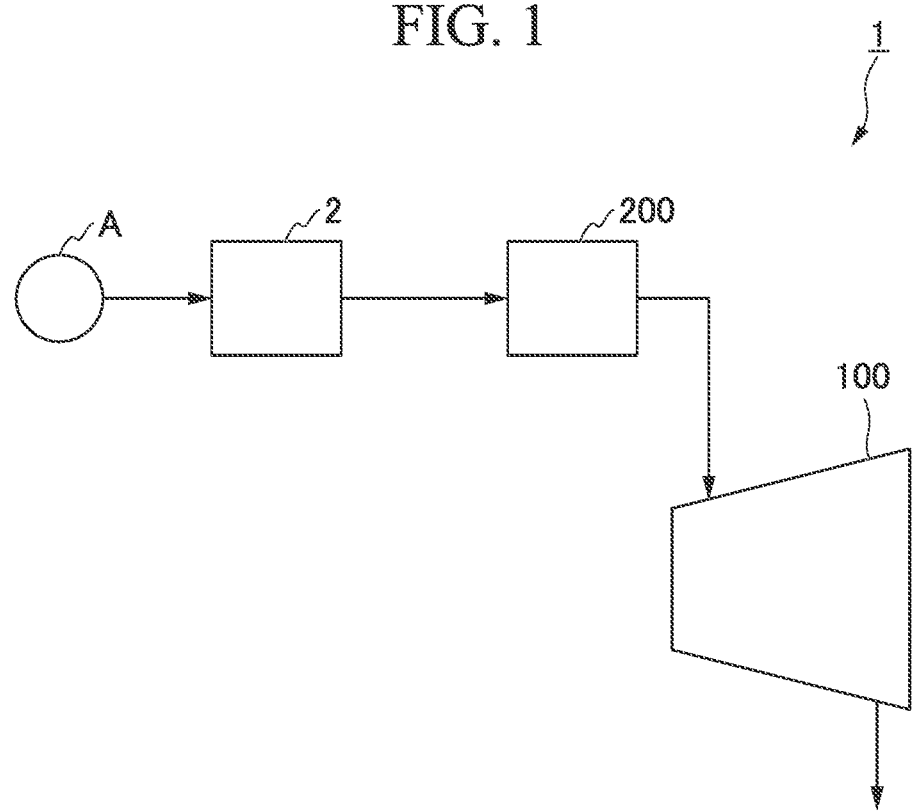
FIG. 1 is a schematic diagram showing the entire constitution of a steam turbine constituted using a stop valve according to an embodiment of the present disclosure.

As illustrated in FIG. 1, a steam turbine 1 in this embodiment includes a turbine main body 100, a regulating valve 200, and a stop valve (trip and throttle valve; TTV) 2.

In the turbine main body 100, steam is supplied from a steam supply source A such as a boiler. In the turbine main body 100, a rotor (not shown) rotatably provided in a casing (not shown) is rotatably driven by the supplied steam. The rotation of the rotor (not shown) is transmitted to, for example, a generator via an output shaft to generate electricity.

The regulating valve 200 is provided on an inlet side of the turbine main body 100 and adjusts an amount of steam. The regulating valve 200 adjusts a degree of valve opening to adjust an amount of steam supplied to the turbine main body 100.

Figure 2:
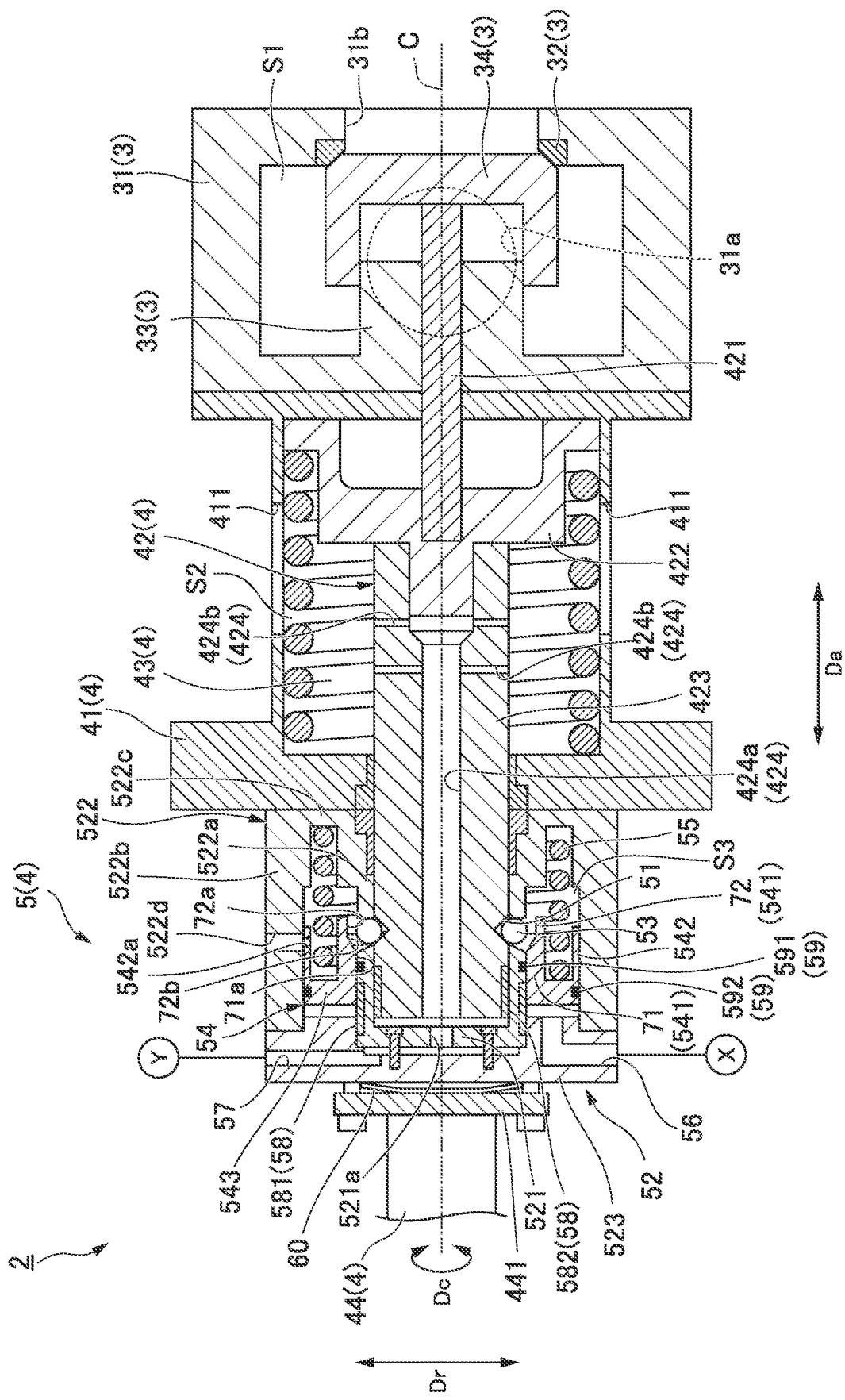
FIG. 2 is a cross-sectional view showing a stop valve according to a first embodiment of the present disclosure.

The stop valve 2 can shut off the supply of steam to the turbine main body 100 at the time of emergency stopping. To be specific, the stop valve 2 is a valve device which opens and closes a flow path through which steam flows. In this embodiment, a state in which steam is continuously supplied to steadily operate the turbine main body 100 is assumed during a normal operation. Furthermore, in this embodiment, a state in which the supply of steam is shut off to perform emergency stopping of the turbine main body 100 is assumed at the time of emergency stopping. As illustrated in FIG. 2, the stop valve 2 in this embodiment includes a valve main body 3 and a valve-driving part 4.

The valve main body 3 has a flow path through which steam flows formed therein. The valve main body 3 in this embodiment includes a valve chamber formation part 31, a valve seat part 32, a valve disc-supporting part 33, and a valve disc 34.

The valve chamber formation part 31 is a casing which forms a valve chamber S1 serving as a space into which steam flows. The valve chamber formation part 31 has an inlet flow path 31a through which steam flowing from an upstream side flows and an outlet flow path 31b through which steam flows out to a downstream side formed therein. The outlet flow path 31b is formed in a position orthogonal to the inlet flow path 31a.

The valve seat part 32 is provided in the outlet flow path 31b through which steam flows. The valve disc-supporting part 33 supports the valve disc 34 inside the valve main body 3. The valve disc-supporting part 33 is integrally formed with the valve main body 3. The valve disc 34 closes the outlet flow path 31b by coming into contact with the valve seat part 32. The valve disc 34 is supported by the valve disc-supporting part 33 to be movable with respect to the valve seat part 32.

The valve-driving part 4 moves the valve disc 34 with respect to the valve seat part 32. The valve-driving part 4 in this embodiment includes a spring chamber formation part 41, a rod part 42, a rod-urging part 43, an actuator part 44, and a connection-switching part 5.

The spring chamber formation part 41 is a casing which forms a spring chamber S2 serving as a space in which the rod-urging part 43 is accommodated. The spring chamber formation part 41 is disposed on a second side of the valve chamber formation part 31 in a central axis direction Da. The spring chamber formation part 41 is integrally fixed to the valve chamber formation part 31. The spring chamber formation part 41 has a spring chamber-opening hole 411 which allows the spring chamber S2 to communicate with the outside. The spring chamber-opening hole 411 passes through the spring chamber formation part 41 in a direction orthogonal to the central axis direction Da (radial direction Dr). The spring chamber formation part 41 has a through-hole through which the rod part 42 in the central axis direction Da can be inserted. The spring chamber formation part 41 supports the rod part 42 in a slidable manner in the central axis direction Da via a guide bush or the like.

The rod part 42 extends along a central axis C. An end portion on a first side in the central axis direction Da of the rod part 42 is connected to the valve disc 34. The end portion on the first side in the central axis direction Da of the rod part 42 in this embodiment is disposed in the valve chamber formation part 31. An end portion on a second side in the central axis direction Da of the rod part 42 is disposed outside of the valve chamber formation part 31. The rod part 42 in this embodiment has a cooling hole 424 through which a coolant flows formed therein. The rod part 42 includes a valve disc side rod part 421, a spring-receiving part 422, and a drive side rod part 423.

In this embodiment, the central axis direction Da is a direction in which the central axis C of the rod part 42 extends. When a side is simply referred to as the first side in the central axis direction Da, the side indicates one side in the central axis direction Da (the right side on the paper in FIG. 2) which is a side on which the valve disc 34 is disposed with respect to the rod part 42. Likewise, when a side is simply referred to as the second side in the central axis direction Da, the side indicates the other side in the central axis direction Da (the left side on the paper in FIG. 2) which is a side on which the actuator part 44 is disposed with respect to the rod part 42.

The valve disc side rod part 421 has a circular columnar shape centered on the central axis C. An end portion on the first side in the central axis direction Da of the valve disc side rod part 421 is connected to the valve disc 34 in the valve chamber formation part 31. An end portion on the second side in the central axis direction Da of the valve disc side rod part 421 is connected to the spring-receiving part 422 in the spring chamber formation part 41. The end portion on the second side in the central axis direction Da of the valve disc side rod part 421 protrudes from the valve main body 3. The valve disc side rod part 421 is supported by the valve disc-supporting part 33 to be slidable in the central axis direction Da.

The spring-receiving part 422 has a disk shape whose diameter is larger than those of the valve disc side rod part 421 and the drive side rod part 423. The spring-receiving part 422 is disposed in the spring chamber S2. The spring-receiving part 422 is connected to the valve disc side rod part 421 and the drive side rod part 423. The spring-receiving part 422 is supported to be slidable in the central axis direction Da when an outer circumferential surface of the drive side rod part 423 is in sliding contact with an inner circumferential surface of the guide bush.

The drive side rod part 423 has a circular columnar shape centered on the central axis C. The drive side rod part 423 has a disk shape whose diameter is larger than that of the valve disc side rod part 421. An end portion on the first side in the central axis direction Da of the drive side rod part 423 is connected to the spring-receiving part 422 in the spring chamber formation part 41. An end portion on the second side in the central axis direction Da of the drive side rod part 423 is disposed outside of the spring chamber formation part 41. To be specific, the end portion on the second side in the central axis direction Da of the valve disc side rod part 421 is accommodated in a casing 52 of the connection-switching part 5 which will be described later. The drive side rod part 423 is supported by the spring chamber formation part 41 to be slidable in the central axis direction Da. The drive side rod part 423 has a main cooling hole 424*a* and outlet cooling holes 424*b* formed therein as a cooling hole 424.

The main cooling hole 424*a* opens in the end portion on the second side in the central axis direction Da of the drive side rod part 423. The main cooling hole 424*a* extends toward the first side in the central axis direction Da. The main cooling hole 424*a* in this embodiment has a circular cross-sectional shape centered on the central axis C. The main cooling hole 424*a* does not pass through the drive side rod part 423 and extends to the middle of the first side in the central axis direction Da. A diameter of the first side of the main cooling hole 424*a* in the central axis direction Da is increased.

The outlet cooling holes 424*b* open in the outer circumferential surface of the drive side rod part 423 to allow the outside to communicate with the main cooling hole 424*a*. The outlet cooling holes 424*b* extend in the radial direction Dr at a position closer to the first side in the central axis direction Da with respect to a concave engaging part 51 which will be described later. The outlet cooling holes 424*b* in this embodiment open in the outer circumferential surface of the drive side rod part 423 to communicate with the spring chamber S2. The outlet cooling holes 424*b* are formed such that an opening part formed in an outer circumferential surface is always located in the spring chamber S2 even when the drive side rod part 423 moves. The outlet cooling holes 424*b* in a plurality of rows (two rows in this embodiment) are formed with the same diameter at intervals in the central axis direction Da. The plurality of outlet cooling holes 424*b* are formed in respective columns at intervals in a circumferential direction Dc centered on the central axis C.

The rod-urging part 43 urges the rod part 42 toward the first side in the central axis direction Da to close the valve seat part 32 by the valve disc 34. The rod-urging part 43 in this embodiment is formed of, for example, an elastic member such as a coil spring. An end portion on the first side in the central axis direction Da of the rod-urging part 43 is in contact with the spring-receiving part 422 in the spring chamber S2. An end portion on the second side in the central axis direction Da of the rod-urging part 43 is in contact with an inner circumferential surface of the spring chamber formation part 41 in the spring chamber S2. The rod-urging part 43 is in a compressed state when the spring-receiving part 422 moves toward the second side in the central axis direction Da. In this state, the rod-urging part 43 urges the spring-receiving part 422 toward the first side in the central axis direction Da.

The actuator part 44 linearly moves the rod part 42 toward the second side in the central axis direction Da against an urging force of the rod-urging part 43 when connected to the rod part 42. The actuator part 44 is connected to the rod part 42 via the connection-switching part 5. The actuator part 44 in this embodiment linearly moves in the central axis direction Da by converting the rotational motion of the driven motor into a linear motion by a ball screw. The actuator part 44 is fixed to the connection-switching part 5 via a flat-plate-like fixing member 441.

The connection-switching part 5 can switch a connection state between the rod part 42 and the actuator part 44 between a connected state and a non-connected state. The connection-switching part 5 in this embodiment includes the concave engaging part 51, the casing 52, a plurality of frame pieces 53, a sleeve part 54, a sleeve-urging part 55, a gas introduction part 56, a coolant supply part 57, a sliding contact part 58, a piston ring 59, and an elastic deformation part 60.

Here, the connected state is a state in which the rod part 42 is allowed to move in cooperation with the motion of the actuator part 44. Furthermore, the non-connected state is a state in which the motion of the actuator part 44 is disconnected from the motion of the rod part 42 and the rod part 42 does not move even when the actuator part 44 is driven. In other words, in the non-connected state, the rod part 42 and the actuator part 44 are joined to each other via the connection-switching part 5, but the rod part 42 cannot be moved by the actuator part 44.

The concave engaging part 51 is formed over the entire circumference of the outer circumferential surface of the rod part 42. The concave engaging part 51 is recessed from the outer circumferential surface of the rod part 42 in the radial direction Dr centered on the central axis C. The concave engaging part 51 in this embodiment is recessed to have a triangular cross-sectional shape. The concave engaging part 51 is formed in the outer circumferential surface of the drive side rod part 423. The concave engaging part 51 is formed at a position which is away from the end portion on the second side in the central axis direction Da of the drive side rod part 423 and in which the drive side rod part 423 is not outside of the casing 52 even when the drive side rod part 423 moves.

The casing 52 covers the rod part 42 from the outside in the radial direction Dr to surround the concave engaging part 51. The casing 52 has an accommodation space S3 joined to the concave engaging part 51 formed therein. The casing 52 is connected to the actuator part 44 and is provided to be slidable with respect to the outer circumferential surface of the rod part 42. The casing 52 in this embodiment is disposed on the second side in the central axis direction Da of the spring chamber formation part 41. The casing 52 has a bottomed cylindrical shape in which the outer circumferential surface of the drive side rod part 423 can be in sliding contact therewith. The end portion on the second side in the central axis direction Da of the drive side rod part 423 is accommodated inside the casing 52. The casing 52 supports the drive side rod part 423 to be slidable in the central axis direction Da. The casing 52 includes a first housing 521, a second housing 522, and a lid part 523.

The first housing 521 is slidable inside the sleeve part 54 in the radial direction. The first housing 521 is slidable on the outer circumferential surface of the rod part 42 at a position closer to the second side in the central axis direction Da with respect to the concave engaging part 51. The first housing 521 in this embodiment has a bottomed cylindrical shape centered on the central axis C. The first housing 521 covers a region of the drive side rod part 423 closet to the second side in the central axis direction Da than the concave engaging part 51. An inner circumferential surface of the first housing 521 is in sliding contact with the outer circumferential surface of the drive side rod part 423. An end surface of the first housing 521 on the first side in the central axis direction Da is formed closer to the second side in the central axis direction Da with respect to the concave engaging part 51. The end surface on the first side in the central axis direction Da of the first housing 521 is inclined from the first side toward the second side in the central axis direction Da outward in the radial direction Dr. The first housing 521 has a first housing through-hole 521a centered on the central axis C formed therein. The first housing through-hole 521a passes through the bottom of the first housing 521 (the end portion on the second side in the central axis direction Da) in the central axis direction Da. The first housing through-hole 521a allows a space on the second side in the central axis direction Da of the first housing 521 to communicate with the main cooling hole 424a.

The second housing 522 can be in sliding contact with the outer side in the radial direction Dr with respect to the sleeve part 54. The second housing 522 is fixed to the first housing 521 by the lid part 523. The second housing 522 in this embodiment includes a second housing inner part 522a, a second housing outer part 522b, and a second housing connection part 522c.

The second housing inner part 522a can be in sliding contact with the outer circumferential surface of the rod part 42 on the first side in the central axis direction Da from the frame pieces 53. The second housing inner part 522a in this embodiment has a cylindrical shape centered on the central axis C. The second housing inner part 522a covers a region of the drive side rod part 423 on the first side in the central axis direction Da from the first housing 521. An inner circumferential surface of the second housing inner part 522a is in sliding contact with the outer circumferential surface of the drive side rod part 423. An end surface on the second side in the central axis direction Da of the second housing 522 is formed on the first side in the central axis direction Da from the concave engaging part 51. The second housing inner part 522a is in sliding contact with the drive side rod part 423 via the guide bush or the like.

The second housing outer part 522b is disposed on the outer side in the radial direction Dr with a gap with respect to the second housing inner part 522a and the first housing 521. The second housing outer part 522b is disposed spaced apart from the second housing inner part 522a to be able to accommodate the sleeve-urging part 55. The second housing outer part 522b is disposed spaced apart from the first housing 521 to be able to accommodate the sleeve part 54. The second housing outer part 522b constitutes a part of an external form of the casing 52. The second housing outer part 522b has a cylindrical shape centered on the central axis C. An inner circumferential surface of the second housing outer part 522b can be in sliding contact with the outer side in the radial direction Dr with respect to the sleeve part 54. The second housing outer part 522b has a second housing through-hole 522d formed to communicate with the outside. The second housing through-hole 522d extends in the radial direction Dr. The second housing through-hole 522d allows the accommodation space S3 in the casing 52 to communicate with the outside.

The second housing connection part 522c is connected to the second housing inner part 522a and the second housing outer part 522b which are disposed away from each other in the radial direction Dr. The second housing connection part 522c is integrally formed with the second housing inner part 522a and the second housing outer part 522b. The second housing connection part 522c constitutes a part of the external form of the casing 52. The second housing connection part 522c is disposed on the first side in the central axis direction Da of the second housing inner part 522a and the second housing outer part 522b. The second housing connection part 522c extends in the radial direction Dr.

The lid part 523 is fixed to the first housing 521 and the second housing 522. The lid part 523 is disposed on the second side in the central axis direction Da with respect to the first housing 521 and the second housing 522. The lid part 523 constitutes a part of the external form of the casing 52. The lid part 523 in this embodiment has a disk shape centered on the central axis C. The lid part 523 is disposed on the second side in the central axis direction Da with a gap with respect to the bottom of the first housing 521. The lid part 523 is fixed to the first housing 521 with a gap with respect to the first housing 521 using a fixing member 441 such as a bolt. The lid part 523 is fixed to the second housing outer part 522b. The lid part 523 is fixed to the fixing member 441 in the actuator part 44 on the second side in the central axis direction Da. The lid part 523 is fixed to the fixing member 441 with a gap in the central axis direction Da.

The frame pieces 53 are disposed in the accommodation space S3. The frame pieces 53 are formed in a shape in which a part thereof can protrude from the outer circumferential surface of the rod part 42 while being accommodated in the concave engaging part 51. The frame pieces 53 in this embodiment are spherical ball members. A diameter of the frame pieces 53 is larger than a depth of the concave engaging part 51 from the outer circumferential surface of the drive side rod part 423. The plurality of frame pieces 53 are provided along the outer circumferential surface of the drive side rod part 423 in the circumferential direction Dc. The frame pieces 53 are disposed between the end surface on the first side in the central axis direction Da of the first housing 521 and the end surface on the second side in the central axis direction Da of the second housing inner part 522*a*.

The sleeve part 54 is disposed to be able to be in sliding contact with the casing 52 in the accommodation space S3. The sleeve part 54 is configured to be movable between a frame piece accommodation position and a frame piece detachment position. When the sleeve part 54 in this embodiment moves from the second side toward the first side in the central axis direction Da, the sleeve part 54 moves from the frame piece detachment position to the frame piece accommodation position. The sleeve part 54 has a cylindrical shape centered on the central axis C. An inner circumferential surface of the sleeve part 54 is in sliding contact with an outer circumferential surface of the first housing 521. An outer circumferential surface of the sleeve part 54 is in sliding contact with the inner circumferential surface of the second housing outer part 522*b*. The sleeve part 54 includes a first extension part 541, a second extension part 542, and a sleeve connection part 543.

Here, the frame piece accommodation position is a position of the sleeve part 54 in which the frame pieces 53 are accommodated in the concave engaging part 51. The frame pieces 53 cannot move from the concave engaging part 51 in a state in which the sleeve part 54 is disposed at the frame piece accommodation position.

Also, the frame piece detachment position is a position of the sleeve part 54 in which the frame pieces 53 are separated from the concave engaging part 51. The frame pieces 53 can move from the concave engaging part 51 in a state in which the sleeve part 54 is disposed at the frame piece detachment position.

The first extension part 541 can be in sliding contact with the first housing 521. The first extension part 541 in this embodiment has a cylindrical shape centered on the central axis C. The inner circumferential surface of the first extension part 541 is in sliding contact with the outer circumferential surface of the first housing 521. The end surface on the first side in the central axis direction Da of the first extension part 541 is disposed at a position at the frame piece accommodation position which is on the first side in the central axis direction Da from the concave engaging part 51 or overlaps the concave engaging part 51. The first extension part 541 includes a frame piece contact part 71 and a frame piece detachment part 72.

The frame piece contact part 71 extends in the central axis direction Da. The frame piece contact part 71 has a frame piece contact surface 71*a* in contact with the frame pieces 53 which are accommodated in the concave engaging part 51 formed at the frame piece accommodation position. The frame piece contact surface 71*a* is a smooth surface extending along the central axis C. The frame piece contact surface 71*a* is in sliding contact with the frame pieces 53 at the frame piece accommodation position. The frame piece contact surface 71*a* is in sliding contact with the outer circumferential surface of the first housing 521 at the frame piece detachment position.

The frame piece detachment part 72 extends from the frame piece contact part 71 toward the second side in the central axis direction Da. The frame piece detachment part 72 is formed such that a diameter thereof is gradually reduced as it is separated from the frame piece contact part 71. The frame piece detachment part 72 has a sleeve inclined surface 72*b* and a frame piece detachment surface 72*a* formed therein in the radial direction Dr.

The sleeve inclined surface 72*b* extends from the end portion on the second side in the central axis direction Da of the frame piece contact surface 71*a* toward the second side in the central axis direction Da. The sleeve inclined surface 72*b* is inclined outward in the radial direction Dr toward the second side in the central axis direction Da. The sleeve inclined surface 72*b* has the end surface on the first side in the central axis direction Da of the first housing 521 and a concave part recessed on the first side in the central axis direction Da formed at the frame piece detachment position.

The frame piece detachment surface 72*a* extends from the end portion on the second side in the central axis direction Da of the frame piece contact surface 71*a* toward the second side in the central axis direction Da. The frame piece detachment surface 72*a* is a smooth surface extending along the central axis C. The frame piece detachment surface 72*a* is located further outward in the radial direction Dr than the frame piece contact surface 71*a*. A position of the frame piece detachment surface 72*a* in the central axis direction Da is disposed at the frame piece accommodation position on the first side from the concave engaging part 51. A position of the frame piece detachment surface 72*a* in the central axis direction Da is disposed at a position at the frame piece detachment position at which the frame piece detachment surface 72*a* overlaps the concave engaging part 51.

The second extension part 542 is disposed away from the first extension part 541 outward in the radial direction Dr. The second extension part 542 can be in sliding contact with the second housing 522. The second extension part 542 is disposed spaced apart from the first extension part 541 to be able to accommodate the sleeve-urging part 55. The second extension part 542 has a cylindrical shape centered on the central axis C. The outer circumferential surface of the second extension part 542 is in sliding contact with the inner circumferential surface of the second housing outer part 522*b*. The second extension part 542 has a second extension part through-hole 542*a* formed therein. The second extension part through-hole 542*a* extends in the radial direction Dr. The second extension part through-hole 542*a* is formed at a position at which a position of the second extension part through-hole 542*a* in the central axis direction Da overlaps the second housing through-hole 522*d* when the sleeve part 54 is disposed at the frame piece detachment position.

The sleeve connection part 543 connects the first extension part 541 and the second extension part 542. The sleeve connection part 543 is integrally formed with the first extension part 541 and the second extension part 542. The sleeve connection part 543 is disposed on the second side in the central axis direction Da of the first extension part 541 and the second extension part 542. The sleeve connection part 543 extends in the radial direction Dr. Thus, the sleeve connection part 543 has a sleeve-urging part accommodation groove in which the sleeve-urging part 55 is accommodated between the first extension part 541 and the second extension part 542 formed in the accommodation space S3.

The sleeve-urging part 55 is accommodated in the accommodation space S3. The sleeve-urging part 55 urges the sleeve part 54 toward the second side in the central axis direction Da. The sleeve-urging part 55 in this embodiment is formed of, for example, an elastic member such as a coil spring. An end portion on the first side in the central axis direction Da of the sleeve-urging part 55 is in contact with the second housing connection part 522*c* in the accommodation space S3. An end portion on the second side in the central axis direction Da of the sleeve-urging part 55 is in contact with the sleeve connection part 543 in the sleeve-urging part accommodation groove. The sleeve-urging part 55 is brought into a compressed state when the sleeve part 54 moves toward the first side in the central axis direction Da. In this state, the sleeve-urging part 55 urges the sleeve connection part 543 toward the second side in the central axis direction Da.

A gas supplied from a gas supply source X is introduced into the accommodation space S3 through the gas introduction part 56. A gas is introduced to the second side in the central axis direction Da with respect to the sleeve part 54 through the gas introduction part 56. High-pressure air from the gas supply source X such as a pump is supplied into the accommodation space S3 having the sleeve part 54 disposed therein through the gas introduction part 56 in this embodiment. The gas introduction part 56 is a through-hole formed in the lid part 523. The gas introduction part 56 opens in an outer circumferential surface of the lid part 523. The gas introduction part 56 extends from the outer circumferential surface of the lid part 523 inward in the radial direction Dr. The gas introduction part 56 allows a pipe through which high-pressure air is supplied to communicate with the accommodation space S3 on the second side in the central axis direction Da with respect to the sleeve part 54 in the casing 52.

A coolant supplied from a coolant supply source Y is supplied to an opening of the main cooling hole 424a through the coolant supply part 57. A coolant is introduced into a space between the lid part 523 and the bottom of the first housing 521 through the coolant supply part 57. Air introduced from the coolant supply source Y such as a pump is introduced through the coolant supply part 57 in this embodiment. The coolant supply part 57 is a through-hole formed in the lid part 523. A position at which the coolant supply part 57 is formed is different from a position at which the gas introduction part 56 is formed at a position in the circumferential direction Dc. The coolant supply part 57 opens in the outer circumferential surface of the lid part 523. The coolant supply part 57 extends from the outer circumferential surface of the lid part 523 inward in the radial direction Dr. The coolant supply part 57 allows a pipe through which air is supplied to communicate with a space between the lid part 523 and the bottom of the first housing 521. Thus, air is supplied to an opening of the main cooling hole 424a via the first housing through-hole 521a through the coolant supply part 57.

The sliding contact part 58 improves the sliding properties of each member with respect to the casing 52. The sliding contact part 58 is a member having a surface with a surface friction coefficient smaller than that of the casing 52. The sliding contact part 58 in this embodiment includes a first sliding contact part 581 and a second sliding contact part 582.

The first sliding contact part 581 is disposed in a region in which the casing 52 and the sleeve part 54 are in sliding contact with each other. To be specific, the first sliding contact part 581 is disposed between the outer circumferential surface of the first housing 521 and the frame piece contact surface 71a. The first sliding contact part 581 is provided to form a part of the outer circumferential surface of the first housing 521. The first sliding contact part 581 is disposed so as not to protrude from the outer circumferential surface of the first housing 521. The first sliding contact part 581 in this embodiment is a cylindrical oilless bush which does not require the replenishment of lubricating oil because of being processed such that, for example, a surface friction coefficient of a surface thereof is smaller than the outer circumferential surface of the first housing 521.

The second sliding contact part 582 is disposed is a region in which the casing 52 and the rod part 42 are in sliding contact with each other. To be specific, the second sliding contact part 582 is disposed between an inner circumferential surface of the first housing 521 and the outer circumferential surface of the drive side rod part 423. The second sliding contact part 582 is provided to from a part of the outer circumferential surface of the drive side rod part 423. The second sliding contact part 582 is disposed on the second side in the central axis direction Da with respect to the concave engaging part 51 so as not to protrude from the outer circumferential surface of the drive side rod part 423. The second sliding contact part 582 in this embodiment is, for example, a cylindrical oilless bush as in the first sliding contact part 581.

The piston ring 59 is disposed in a region in which the casing 52 and the sleeve part 54 are in sliding contact with each other. The piston ring 59 maintains an attitude of the sleeve part 54 with respect to the casing 52 and prevents a gas supplied to the second side in the central axis direction Da with respect to the sleeve part 54 from leaking toward the first side in the central axis direction Da of the sleeve part 54. The piston ring 59 in this embodiment includes a first piston ring 591 and a second piston ring 592.

The first piston ring 591 is disposed between the outer circumferential surface of the first housing 521 and the frame piece contact surface 71a. The first piston ring 591 is provided to form a part of the outer circumferential surface of the first housing 521. The first piston ring 591 is disposed on the first side in the central axis direction Da from the first sliding contact part 581. The first piston ring 591 seals between the outer circumferential surface of the first housing 521 and the frame piece contact surface 71a. Furthermore, the first piston ring 591 maintains an attitude of the first extension part 541 with respect to the first housing 521 so as not to be inclined with respect to the first housing 521 when the sleeve part 54 moves.

The second piston ring 592 is disposed between an inner circumferential surface of the second housing 522 and the outer circumferential surface of the second extension part 542. The second piston ring 592 is provided to form a part of the outer circumferential surface of the second extension part 542. The second piston ring 592 is disposed on the second side in the central axis direction Da from the second extension part through-hole 542a. The second piston ring 592 seals between the inner circumferential surface of the second housing 522 and the outer circumferential surface of the second extension part 542. Furthermore, the second piston ring 592 maintains an attitude of the second extension part 542 with respect to the second housing 522 so as not to be inclined with respect to the second housing 522 when the sleeve part 54 moves.

The elastic deformation part 60 is disposed between the actuator part 44 and the casing 52. The elastic deformation part 60 is configured to be elastically deformable in the central axis direction Da. The elastic deformation part 60 in this embodiment is provided in a gap between the lid part 523 and the fixing member 441. The elastic deformation part 60 may be adopted as long as the elastic deformation part 60 is an elastically deformable member, but in this embodiment, the elastic deformation part 60 is, for example, a disc spring. The elastic deformation part 60 is brought into a compressed state when an interval of the gap between the lid part 523 and the fixing member 441 is reduced.

An operation of the stop valve 2 having the above-described constitution will be described below.

In the above-described steam turbine 1, the regulating valve 200 and the stop valve 2 are set to an open state to flow steam from the steam supply source A into the turbine main body 100 during a normal operation.

Figure 3:
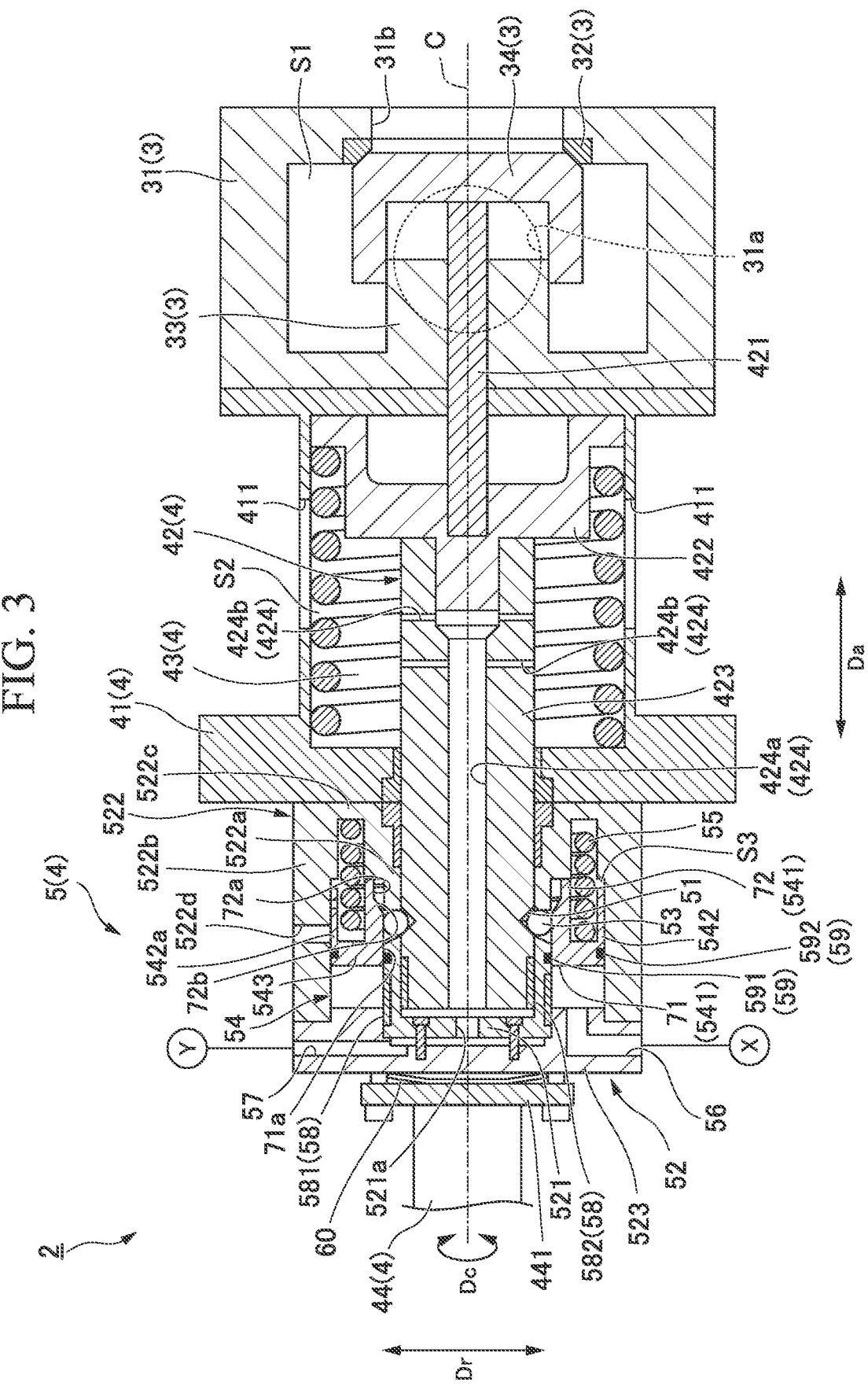
FIG. 3 is a cross-sectional view showing a state in which a sleeve part is located at a frame piece accommodation position in the stop valve according to the first embodiment of the present disclosure.

The valve disc 34 is disposed at a position at which the valve disc 34 closes the valve seat part 32 when the stop valve 2 is set to a closed state. In this case, a position of the concave engaging part 51 in the central axis direction Da is between the end surface on the first side in the central axis direction Da of the first housing 521 and the end surface on the second side in the central axis direction Da of the second housing inner part 522a. When the valve disc 34 is separated from the valve seat part 32 to set a state from this state to a state in which the stop valve 2 is in an open state, first, high-pressure air is supplied to the second side in the central axis direction Da of the sleeve part 54 in the accommodation space S3 via the gas introduction part 56. As illustrated in FIG. 3, the sleeve part 54 is pushed and moved toward the first side in the central axis direction Da while setting the sleeve-urging part 55 to a compressed state using the high-pressure air. The sleeve part 54 moves from the frame piece detachment position to the frame piece accommodation position when moving toward the first side in the central axis direction Da. A position of the frame piece contact part 71 in the central axis direction Da overlaps a position of the concave engaging part 51 in the central axis direction Da when the sleeve part 54 moves to the frame piece accommodation position. As a result, the frame pieces 53 and the frame piece contact surface 71a are in contact with each other in a state in which the frame pieces 53 is accommodated in the concave engaging part 51. Thus, the frame pieces 53 cannot move from the concave engaging part 51 and the rod part 42 and the actuator part 44 are connected to each other.

Figure 4:
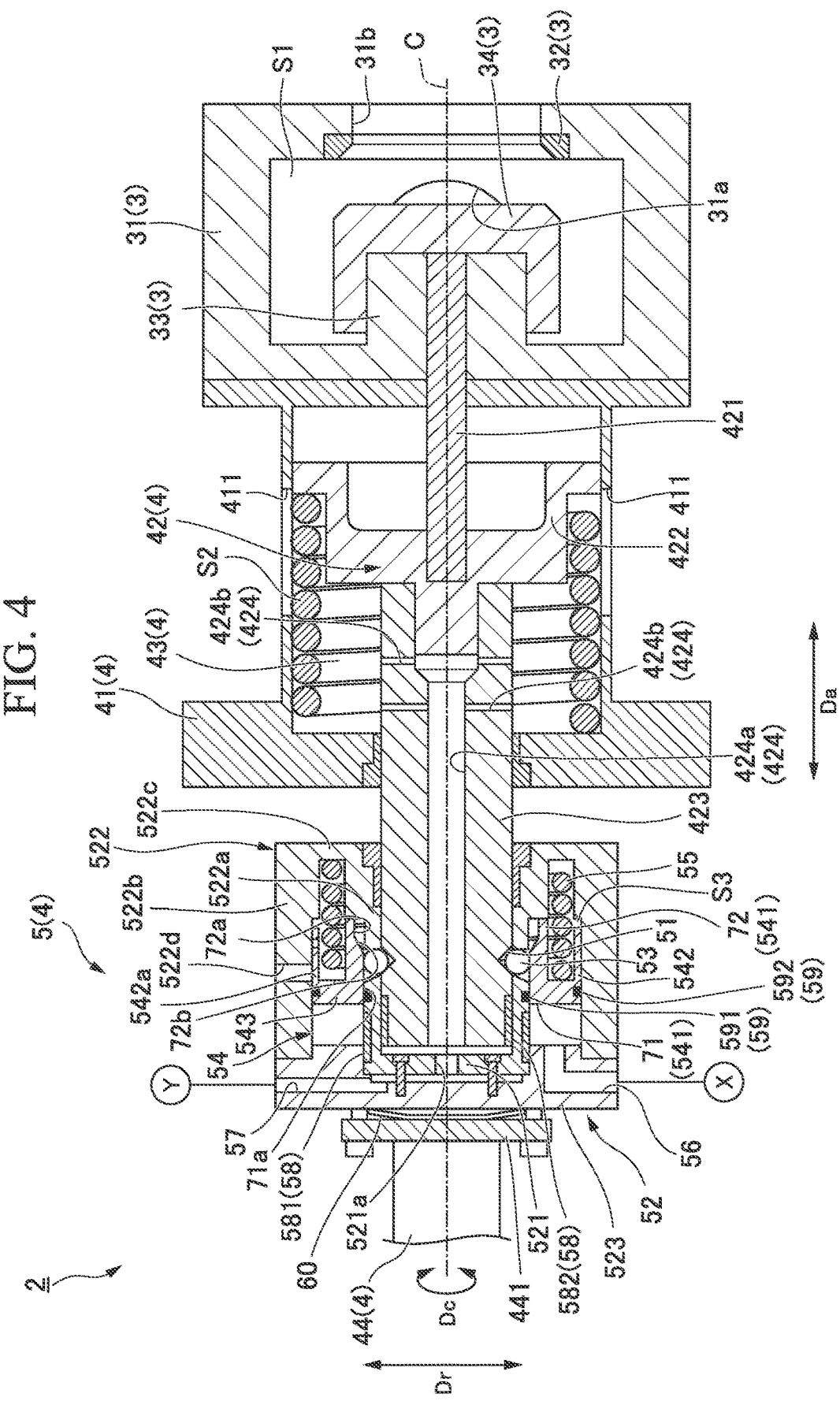
FIG. 4 is a cross-sectional view showing the stop valve during a normal operation in which an actuator part is driven in a state in which the sleeve part is located at the frame piece accommodation position in the first embodiment of the present disclosure.

Subsequently, as illustrated in FIG. 4, the casing 52 moves toward the second side in the central axis direction Da via the lid part 523 fixed to the fixing member 441 when the actuator part 44 moves toward the second side in the central axis direction Da. The end portion on the second side in the central axis direction Da of the second housing inner part 522a and the frame pieces 53 are in contact with each other when the casing 52 moves and the frame pieces 53 are pushed toward the second side in the central axis direction Da. The frame pieces 53 also move toward the second side in the central axis direction Da together with the casing 52 while being accommodated in the concave engaging part 51 when being caused to be unable to move by the sleeve part 54. A surface on the second side in the central axis direction Da of the concave engaging part 51 is pushed by the frame pieces 53 when the frame pieces 53 move and the drive side rod part 423 moves toward the second side in the central axis direction Da. The spring-receiving part 422 moves toward the second side in the central axis direction Da together with the valve disc side rod part 421 while pushing the rod-urging part 43 to be in a compressed state when the drive side rod part 423 moves toward the second side in the central axis direction Da. Thus, the rod part 42 linearly moves toward the second side in the central axis direction Da against an urging force of the rod-urging part 43 together with the valve disc 34. As a result, the valve disc 34 is separated from the valve seat part 32 and the stop valve 2 is brought into an open state.

Figure 5:
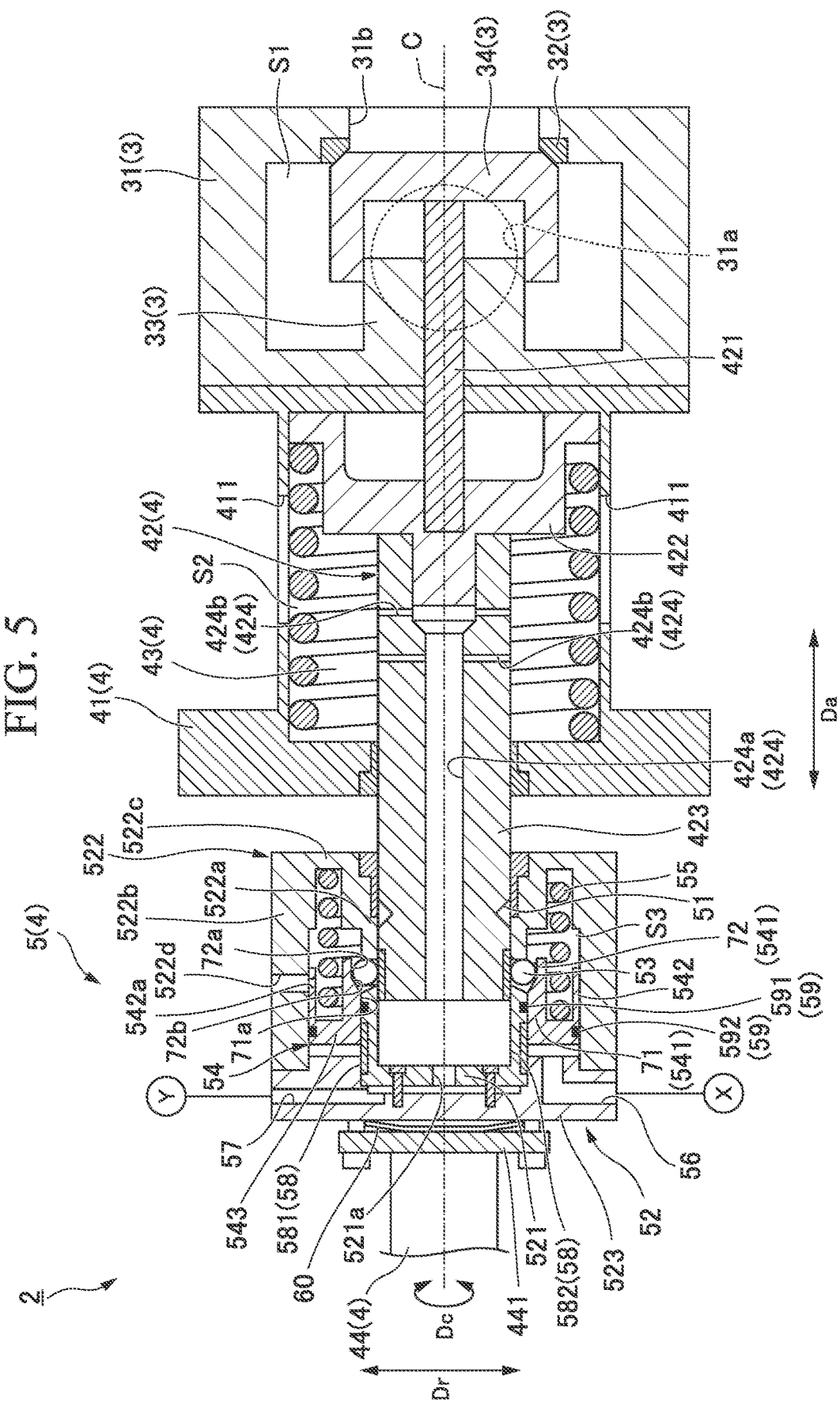
FIG. 5 is a cross-sectional view showing the stop valve at the time of emergency stop in which the introduction of a gas through a gas introduction part is stopped in the first embodiment of the present disclosure.

Next, when the turbine main body 100 is in an emergency stop state in which the turbine main body 100 is brought into an emergency stop when an abnormality occurs in the turbine main body 100, the stop valve 2 is switched from an open state to a closed state. At that time, the supply of high-pressure air from the gas introduction part 56 is stopped by the stop valve 2. The sleeve part 54 is pushed back toward the second side in the central axis direction Da by an urging force of the sleeve-urging part 55 as illustrated in FIG. 5 when the supply of the high-pressure air is stopped. The sleeve part 54 moves from the frame piece accommodation position to the frame piece detachment position when moving toward the second side in the central axis direction Da. A position of the frame piece detachment surface 72a in the central axis direction Da overlaps a position of the concave engaging part 51 in the central axis direction Da when the sleeve part 54 moves to the frame piece accommodation position. As a result, the frame pieces 53 can move while being separated from the concave engaging part 51. Thus, the frame pieces 53 are separated from the concave engaging part 51 and the rod part 42 and the actuator part 44 are brought into a non-connected state.

The spring-receiving part 422 is pushed toward the first side in the central axis direction Da by the rod-urging part 43 when the rod part 42 and the actuator part 44 are brought into the non-connected state. For this reason, the rod part 42 linearly moves toward the first side in the central axis direction Da together with the valve disc 34. As a result, the valve disc 34 is in contact with the valve seat part 32 and thus the stop valve 2 is brought into a closed state.

According to the above-described stop valve 2, it is possible to switch a connection state between the rod part 42 and the actuator part 44 when the positions of the frame pieces 53 with respect to the concave engaging part 51 by controlling the movement of the sleeve part 54 using high-pressure air. It is possible to prevent the occurrence of inconvenience such as the frame pieces 53 being unable to move due to the introduction of contaminants when the sleeve part 54 is always not in contact with the frame pieces 53. Particularly, it is possible to further prevent the occurrence of inconvenience around the sliding portion because the areas of the frame pieces 53 in sliding contact with other components are reduced when the frame pieces 53 are spherical. Thus, it is possible to move the valve disc 34 by switching the connection state between the rod part 42 and the actuator part 44 with high accuracy.

Also, when the sleeve part 54 moves by high-pressure air, there is no concern concerning the occurrence of inconvenience such as oil leakage caused by aging deterioration or contamination of the peripheral facilities due to such oil as compared with when a hydraulic type is used. It is possible to switch the connection state between the rod part 42 and the actuator part 44 with higher accuracy. In addition, it is possible to omit the maintenance required for using oil.

The sleeve part 54 is sandwiched between the first housing 521 and the second housing 522 in a sliding contact state. For this reason, the first housing 521 and the second housing 522 function as a guide when the sleeve part 54 is moved in the central axis direction Da. When high-pressure air is introduced in a state in which the sleeve part 54 is guided by the first housing 521 and the second housing 522, it is possible to smoothly move the sleeve part 54 toward the first side in the central axis direction Da using the pressure of the high-pressure air. In other words, it is possible to efficiently use the pressure of the high-pressure air supplied to the accommodation space S3 on the second side in the central axis direction Da of the sleeve part 54.

In addition, the sleeve part 54 is continuously urged toward the second side in the central axis direction Da by the sleeve-urging part 55 in a state in which the sleeve part 54 is located at the frame piece accommodation position. In this state, when the introduction of the high-pressure air from the gas introduction part 56 is stopped, the sleeve part 54 is pushed by an urging force of the sleeve-urging part 55 and moves toward the second side in the central axis direction Da. Also at that time, it is possible to smoothly move the sleeve part 54 toward the second side in the central axis direction Da when the sleeve part 54 is guided by the first housing 521 and the second housing 522. In other words, it is possible to efficiently use an urging force of the sleeve-urging part 55. Thus, it is possible to smoothly move the sleeve part 54 between the frame piece detachment position and the frame piece accommodation position.

When the stop valve 2 is assembled, the rod part 42 is finally inserted in a state in which the sleeve part 54 and the frame pieces 53 are accommodated in the casing 52. At that time, the drive side rod part 423 is inserted while being in sliding contact with the inner circumferential surface of the second housing 522 in a state in which the first side in the central axis direction Da of the casing 52 faces upward. However, in this state, when the drive side rod part 423 is inserted, the frame pieces 53 fly against the inner circumferential surface of the first housing 521 before the drive side rod part 423 is completely inserted, hit the drive side rod part 423, and fall into a space into which the drive side rod part 423 is inserted in some cases. Particularly, when the frame pieces 53 are spherical as in this embodiment, it is easy for the frame pieces 53 to fall. Incidentally, in this embodiment, the end surface on the first side in the central axis direction Da of the first housing 521, which is a side on which the drive side rod part 423 is inserted, is inclined. For this reason, it is possible to insert the frame pieces 53 toward the inside of the accommodation space S3 when the rod part 42 is inserted. Thus, it is possible to prevent the frame pieces 53 from becoming an obstacle when the rod part 42 is inserted. Thus, it is possible to improve the assembling property of the stop valve 2.

The sleeve-urging part accommodation groove is formed to be sandwiched by the first extension part 541 and the second extension part 542 in the radial direction Dr. Moreover, the first extension part 541 is supported by the first housing 521 from the outside in the radial direction Dr. Furthermore, the second extension part 542 is supported by the second housing 522 from the inside in the radial direction Dr. For this reason, when the sleeve part 54 is moved by the sleeve-urging part 55 toward the second side in the central axis direction Da, the sleeve part 54 moves while being supported by the first extension part 541 and the second extension part 542. Thus, it is possible to prevent the sleeve part 54 from being inclined in the central axis direction Da and causing it to be hooked to the first housing 521 or the second housing 522. As a result, it is possible to move the sleeve part 54 more smoothly from the frame piece detachment position to the frame piece accommodation position.

It is possible to improve the sliding property between the outer circumferential surface of the first housing 521 and the frame piece contact surface 71*a* by the first sliding contact part 581. Furthermore, it is possible to improve the sliding property between the inner circumferential surface of the first housing 521 and the outer circumferential surface of the drive side rod part 423 by the second sliding contact part 582. Therefore, it is possible to improve the sliding property of the sleeve part 54 and the rod part 42 with respect to the casing 52 without supplying another lubricant such as lubricating oil.

Particularly, when the first sliding contact part 581 and the second sliding contact part 582 are oilless bushes, it is possible to secure the sliding property of the sleeve part 54 and the rod part 42 with respect to the casing 52 without performing maintenance such as the supply of a lubricant.

The first piston ring 591 seals between the outer circumferential surface of the first housing 521 and the frame piece contact surface 71*a*. Furthermore, the second piston ring 592 seals between the inner circumferential surface of the second housing outer part 522*b* and the outer circumferential surface of the second extension part 542. For this reason, it is possible to prevent high-pressure air introduced to the second side in the central axis direction Da of the sleeve part 54 from flowing directly to the first side in the central axis direction Da of the sleeve part 54. As a result, it is possible to move the sleeve part 54 efficiently using the pressure of the high-pressure air.

In addition, an attitude of the sleeve part 54 with respect to the first housing 521 is maintained by the first piston ring 591 and an attitude of the sleeve part 54 with respect to the second housing 522 is maintained by the second piston ring 592. Therefore, it is possible to smoothly move the sleeve part 54 with respect to the casing 52 without impairing the sliding property of the sleeve part 54 with respect to the casing 52.

Air supplied from the coolant supply part 57 flows into a space between the lid part 523 and the bottom of the first housing 521. After that, the air flows from the space into an opening of the main cooling hole 424*a* via the first housing through-hole 521*a*. The air flowing into the main cooling hole 424*a* flows in the main cooling hole 424*a* from the second side toward the first side in the central axis direction Da. After that, the air flows into the outlet cooling holes 424*b* and is discharged into the spring chamber S2. The air discharged into the spring chamber S2 is discharged from the spring chamber-opening hole 411 to the outside. In this way, when the air supplied from the coolant supply part 57 flows to the main cooling hole 424*a*, the outer circumferential surface of the drive side rod part 423 is cooled. As a result, the frame pieces 53 disposed around the drive side rod part 423 are cooled. Thus, it is possible to prevent a temperature of the outer circumferential surface of the drive side rod part 423 from being too high even when a temperature of the outer circumferential surface of the drive side rod part 423 increases due to the frictional heat generated by the sliding contact with the first housing 521 or the second housing 522 or the heat transmitted from high-temperature steam flowing through the valve chamber S1. In addition, for example, when a lubricant for improving the sliding property is applied to the spherical frame pieces 53, it is possible to prevent the lubricant from volatilizing due to the high temperature of the frame pieces 53 in contact with the outer circumferential surface of the drive side rod part 423.

The elastic deformation part 60 is provided between the fixing member 441 and the lid part 523. For this reason, even when the casing 52 moves due to inertial force after the actuator part 44 stops, it is possible to absorb such a load by the elastic deformation part 60. Likewise, when the valve disc 34 is in contact with the valve seat part 32 by moving the casing 52 toward the first side in the central axis direction Da by the actuator part 44, the casing 52 is further pushed by the actuator part 44 when the valve disc 34 is in contact with the valve seat part 32 and then the actuator part 44 stops in some cases. Even in such a case, it is possible to absorb a load generated in the casing 52 using the elastic deformation part 60. Therefore, it is possible to secure the reliability of the behavior of the stop valve 2 without using a motor with high performance such as a servo motor for the actuator part 44.

In addition, it is possible to stably supply steam to the turbine main body 100 by the stop valve 2 in which the reliability of the switching of the connection state is secured when the stop valve 2 is used for the steam turbine 1. Therefore, it is possible to improve the reliability of the steam turbine 1.

Second Embodiment

A second embodiment of the stop valve 2 of the present disclosure will be described below with reference to FIG. 6. The second embodiment and the first embodiment differ in that, in the stop valve 2 illustrated in the second embodiment, a connection-switching part 5 includes a retainer part 65. Therefore, in the description of the second embodiment, constituent elements that are the same as those of the first embodiment will be denoted with the same reference numerals and description thereof will be omitted.

Figure 6:
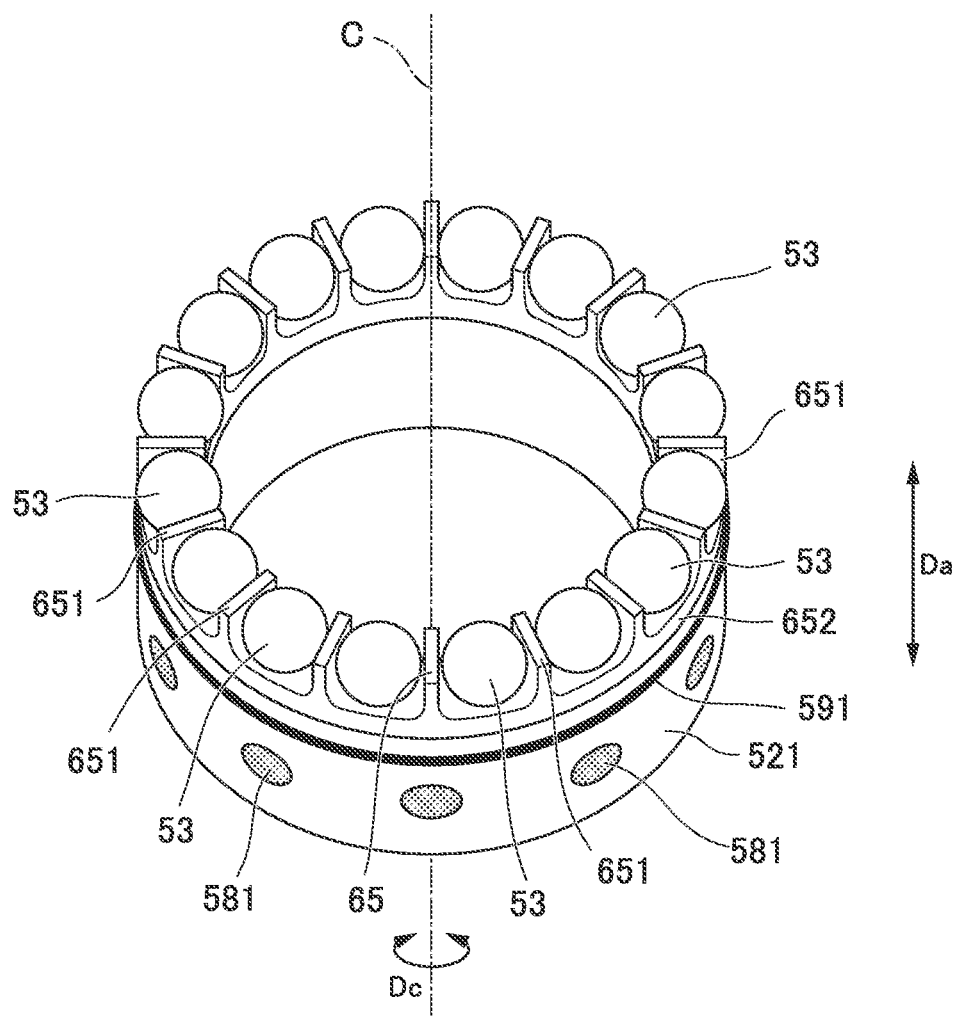
FIG. 6 is a perspective view showing a first housing and a retainer part in a second embodiment of the present disclosure.

As illustrated in FIG. 6, the connection-switching part 5 further includes the retainer part 65 configured to evenly dispose a plurality of frame pieces 53 in the circumferential direction Dc. The retainer part 65 is integrally formed with the casing 52. To be specific, the retainer part 65 is attached to an end portion on the first side in the central axis direction Da of a first housing 521. The retainer part 65 in this embodiment includes partition parts 651 and a connection part 652.

The partition parts 651 extend in the central axis direction Da. The partition parts 651 have a flat plate shape. The plurality of partition parts 651 are provided in the circumferential direction Dc at predetermined intervals. Each of the partition parts 651 is disposed between a plurality of frame pieces 53. Here, the predetermined intervals are intervals which are larger than a diameter of one frame piece 53 and smaller than the total of diameters of two frame pieces 53.

The connection part 652 joins the plurality of partition parts 651. The connection part 652 has an annular shape centered on the central axis C. The connection part 652 is integrally formed with the partition part 651. A surface of the connection part 652 on a side on which the partition part 651 is not formed is fixed to the end portion on the first side in the central axis direction Da of the first housing 521.

According to the stop valve 2, it is possible to prevent the frame pieces 53 from being biased toward a part in the circumferential direction Dc when the retainer part 65 is included. Therefore, it is possible to stably accommodate the frame pieces 53 over the entire circumference of the concave engaging part 51. Thus, it is possible to hold the drive side rod part 423 over the entire circumference and stably maintain the connected state.

Another Modified Example of Embodiment

Although the embodiments of the present disclosure have been described in detail above with reference to the drawings, the constitutions, combinations thereof, and the like of the embodiments are merely examples and additions, omissions, substitutions, and other changes of the constitution are possible without departing from the gist of the present disclosure. Furthermore, the present disclosure is not limited by the embodiments, but is limited only by the scope of the claims.

It should be noted that a sleeve part 54 is not limited to a structure in which a first extension part 541 and a second extension part 542 are provided as in this embodiment. The sleeve part 54 may have a block shape in which the sleeve part 54 does not have a sleeve-urging part accommodation groove formed therein and a shape in which only one of the first extension part 541 and the second extension part 542 is formed may be provided.

A casing 52 is not limited to a structure in which a first housing 521 and a second housing 522 is provided. For example, the casing 52 may not have the first housing 521 and a structure in which the sleeve part 54 is in direct sliding contact with an outer circumferential surface of a drive side rod may be provided.

A gas introduction part 56 and a coolant supply part 57 may have a structure in which gases or coolants are supplied from different supply destinations as in this embodiment, but may have a structure in which a gas or a coolant is supplied from the same supply destination. For example, steam may be supplied to the gas introduction part 56 and the coolant supply part 57 using a steam supply source A as a supply destination.

A sliding contact part 58 is not limited to a structure in which only a first sliding contact part 581 and a second sliding contact part 582 in this embodiment are provided. For example, the sliding contact part 58 may have a structure in which only one of the first sliding contact part 581 and the second sliding contact part 582 is provided and may have a structure in which another sliding contact part 58 is further provided. When another sliding contact part 58 is provided, for example, the other sliding contact part 58 may be disposed between a second housing outer part 522b and a second extension part 542.

A piston ring 59 is not limited to a structure in which only a first piston ring 591 and a second piston ring 592 in this embodiment are provided. For example, the piston ring 59 may have a structure in which only one of the first piston ring 591 and the second piston ring 592 is provided and may have a structure in which another piston ring 59 is further provided.

EXPLANATION OF REFERENCES

1 Steam turbine
100 Turbine main body
200 Regulating valve
A Steam supply source
2 Stop valve
3 Valve main body
31 Valve chamber formation part
S1 Valve chamber
31a Inlet flow path
31b Outlet flow path
32 Valve seat part
33 Valve disc-supporting part
34 Valve disc
4 Valve-driving part
41 Spring chamber formation part
S2 Spring chamber
411 Spring chamber-opening hole
42 Rod part
421 Valve disc side rod part
422 Spring-receiving part
423 Drive side rod part
424 Cooling hole
424a Main cooling hole
424b Outlet cooling hole
C Central axis
Da Central axis direction Dr Radial direction
Dc Circumferential direction
43 Rod-urging part
44 Actuator part
441 Fixing member
5 Connection-switching part
51 Concave engaging part
52 Casing
S3 Accommodation space
521 First housing
521a First housing through-hole
522 Second housing
522a Second housing inner part
522b Second housing outer part
522d Second housing through-hole
522c Second housing connection part
523 Lid part
53 Frame piece
54 Sleeve part
541 First extension part
71 Frame piece contact part
71a Frame piece contact surface
72 Frame piece detachment part
72b Sleeve inclined surface
72a Frame piece detachment surface
542 Second extension part
542a Second extension part through-hole
543 Sleeve connection part
55 Sleeve-urging part
56 Gas introduction part
X Gas supply source
57 Coolant supply part
Y Coolant supply source
58 Sliding contact part
581 First sliding contact part
582 Second sliding contact part
59 Piston ring
591 First piston ring
592 Second piston ring
60 Elastic deformation part
65 Retainer part
651 Partition part
652 Connection part

What is claimed is:

1. A stop valve, comprising:
a valve seat part which is provided in a flow path through which steam flows;
a valve disc which closes the flow path by coming into contact with the valve seat part;
a rod part which extends along a central axis and in which an end portion on a first side in a central axis direction is connected to the valve disc;
a rod-urging part which urges the rod part toward the first side in the central axis direction to close the valve seat part by the valve disc;
an actuator part which linearly moves the rod part toward a second side in the central axis direction against an urging force of the rod-urging part when being connected to the rod part; and
a connection-switching part which is able to switch a connection state between the rod part and the actuator part between a connected state and a non-connected state,
wherein the connection-switching part includes:
a concave engaging part which is formed over the entire circumference of an outer circumferential surface of the rod part and recessed from the outer circumferential surface of the rod part in a radial direction centered on the central axis;
a casing which has an accommodation space joined to the concave engaging part formed therein by covering the rod part from the outside in the radial direction to surround the concave engaging part and provided to be connected to the actuator part and to be able to be in sliding contact with the outer circumferential surface of the rod part;
a plurality of frame pieces which are disposed in the accommodation space and in which a part thereof protrudes from the outer circumferential surface of the rod part while being accommodated in the concave engaging part;
a sleeve part which is disposed in the accommodation space to be able to be in sliding contact with the casing, and is able to move between a frame piece accommodation position in which the frame pieces are accommodated in the concave engaging part and a frame piece detachment position in which the frame pieces are separated from the concave engaging part; and
a gas introduction part through which a gas is introduced into the accommodation space,
the sleeve part moves from the frame piece detachment position to the frame piece accommodation position when the gas is introduced into the accommodation space, and
the casing comes into contact with the frame pieces disposed at the frame piece accommodation position when being moved toward the second side in the central axis direction.

2. The stop valve according to claim 1, wherein the connection-switching part further includes a sleeve-urging part which is accommodated in the accommodation space and urges the sleeve part toward the second side in the central axis direction, and
the casing includes:
a first housing which is able to be in sliding contact with the sleeve part inward in the radial direction and is able to be in sliding contact with the outer circumferential surface of the rod part at a position closer to the second side in the central axis direction with respect to the concave engaging part; and
a second housing which is able to be in sliding contact with the sleeve part outward in the radial direction and fixed to the first housing,
the gas is introduced to the position closer to the second side in the central axis direction with respect to the sleeve part through the gas introduction part, and
the sleeve part moves from the frame piece detachment position to the frame piece accommodation position when moving from the second side toward the first side in the central axis direction.

3. The stop valve according to claim 2, wherein an end surface of the first housing on the first side in the central axis direction is formed closer to the second side in the central axis direction with respect to the concave engaging part and inclined from the first side toward the second side in the central axis direction outward in the radial direction.

4. The stop valve according to claim 2, wherein the sleeve part includes a first extension part which is able to be in sliding contact with the first housing;
a second extension part which is disposed to be separated from the first extension part to the outside in the radial direction and is able to be in sliding contact with the second housing; and a sleeve connection part which connects the first extension part and the second extension part and which has a sleeve-urging part accommodation groove in which the sleeve-urging part is accommodated between the first extension part and the second extension part formed therein.

5. The stop valve according to claim 1, wherein the connection-switching part includes a retainer part including a plurality of partition parts which extend in the central axis direction and are disposed between the plurality of frame pieces at predetermined intervals in a circumferential direction centered on the central axis and an annular connection part which connects the plurality of partition parts.

6. The stop valve according to claim 1, wherein the connection-switching part further includes a sliding contact part which is disposed in a region in which the casing and the sleeve part are in sliding contact with each other and has a surface with a surface friction coefficient smaller than that of the casing.

7. The stop valve according to claim 1, wherein the connection-switching part further includes a piston ring which is disposed in a region in which the casing and the sleeve part are in sliding contact with each other.

8. The stop valve according to claim 1, wherein the rod part includes: a main cooling hole which opens in an end portion of the rod on the second side in the central axis direction and extends toward the first side in the central axis direction is formed therein and an outlet cooling hole which extends in the radial direction closer to the first side in the central axis direction with respect to the concave engaging part and opens in the outer circumferential surface of the rod to allow the outside to communicate with the main cooling hole which is formed therein; and the connection-switching part includes a coolant supply part which supplies a coolant to an opening of the main cooling hole.

9. The stop valve according to claim 1, wherein the connection-switching part further includes an elastic deformation part which is disposed between the actuator part and the casing and is elastically deformable in the central axis direction.

10. The stop valve according to claim 1, wherein the frame pieces are spherical ball members.

11. A steam turbine, comprising:
the stop valve according to claim 1; and
a turbine main body which is driven by steam supplied through a flow path which is opened and closed by the stop valve.

* * * * *